United States Patent
Riegel et al.

(10) Patent No.: US 9,774,914 B2
(45) Date of Patent: Sep. 26, 2017

(54) SCHEDULING VIDEO CONTENT FROM MULTIPLE SOURCES FOR PRESENTATION VIA A STREAMING VIDEO CHANNEL

(71) Applicant: WOWZA MEDIA SYSTEMS, LLC, Golden, CO (US)

(72) Inventors: Brian M. Riegel, Golden, CO (US); David Stubenvoll, Golden, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/226,159

(22) Filed: Aug. 2, 2016

(65) Prior Publication Data
US 2017/0064400 A1    Mar. 2, 2017

Related U.S. Application Data

(60) Provisional application No. 62/209,685, filed on Aug. 25, 2015.

(51) Int. Cl.
| | |
|---|---|
| *H04N 7/173* | (2011.01) |
| *H04N 21/472* | (2011.01) |
| *H04N 21/482* | (2011.01) |
| *H04N 21/2187* | (2011.01) |
| *H04N 21/237* | (2011.01) |
| *H04N 21/262* | (2011.01) |

(Continued)

(52) U.S. Cl.
CPC ... *H04N 21/47202* (2013.01); *H04N 21/2187* (2013.01); *H04N 21/237* (2013.01);
(Continued)

(58) Field of Classification Search
CPC .......... H04N 7/17318; H04N 21/4788; H04N 21/6125; H04N 21/41407;
(Continued)

(56) References Cited

U.S. PATENT DOCUMENTS

| | | | |
|---|---|---|---|
| 7,733,808 B2 * | 6/2010 | Hu | H04N 7/17318 370/230 |
| 8,321,041 B2 | 11/2012 | Jellison, Jr. et al. | |

(Continued)

FOREIGN PATENT DOCUMENTS

| | | |
|---|---|---|
| EP | 1083686 A2 | 3/2001 |
| WO | 0143322 A2 | 6/2001 |

OTHER PUBLICATIONS

"Using Live Playlists to Schedule Video Playback," UStream Support, https://support.ustream.tv/hc/en-us/articles/207852057-Using-Live-Playlists-to-schedule-video-playback, printed Feb. 20, 2014, 5 pages.

*Primary Examiner* — Jason Salce
(74) *Attorney, Agent, or Firm* — Toler Law Group, PC

(57) ABSTRACT

A method includes receiving at least one search term at a computing device coupled to a first content source storing first video content, the at least one search term associated with a streaming video channel. The method also includes receiving information based on the at least one search term, the information associated with second video content available from a second content source. The method further includes generating a streaming schedule for the streaming video channel. The streaming schedule indicates that during a first time period, the streaming video channel is to present the first video content from the first content source. The streaming schedule also indicates that, during a second time period, the streaming video channel is to present the second video content available from the second content source.

19 Claims, 7 Drawing Sheets

(51) Int. Cl.
*H04N 21/2668* (2011.01)
*H04N 21/2743* (2011.01)

(52) U.S. Cl.
CPC ... *H04N 21/2668* (2013.01); *H04N 21/26258* (2013.01); *H04N 21/2743* (2013.01); *H04N 21/47217* (2013.01); *H04N 21/4826* (2013.01); *H04N 21/4828* (2013.01)

(58) Field of Classification Search
CPC ......... H04N 21/47202; H04N 21/2223; H04N 21/26258; H04N 21/4825; G06F 17/30761; G06F 17/30772; G06F 17/30053; H04L 65/60; H04L 67/104; H04L 67/306; H04L 65/4084; H04L 63/0428
See application file for complete search history.

(56) References Cited

U.S. PATENT DOCUMENTS

| | | | |
|---|---|---|---|
| 8,434,104 B2 | 4/2013 | Weihs et al. | |
| 8,522,289 B2 * | 8/2013 | Athsani | G06Q 30/02 707/733 |
| 8,539,542 B1 * | 9/2013 | Elhag | H04N 21/2665 725/105 |
| 8,589,992 B2 | 11/2013 | Babic | |
| 8,621,508 B2 | 12/2013 | Rowe et al. | |
| 2004/0032424 A1 * | 2/2004 | Florschuetz | G06F 17/30017 715/748 |
| 2008/0163302 A1 * | 7/2008 | Khedouri | G06F 17/30094 725/46 |
| 2010/0138870 A1 | 6/2010 | Anthru et al. | |
| 2010/0274816 A1 * | 10/2010 | Guzik | G11B 27/034 707/802 |
| 2012/0240148 A1 * | 9/2012 | Liu | H04N 21/25816 725/25 |
| 2012/0284755 A1 * | 11/2012 | Keret | H04N 21/6181 725/62 |
| 2013/0145399 A1 * | 6/2013 | Wodka | H04N 21/25866 725/46 |
| 2014/0047335 A1 | 2/2014 | Lewis et al. | |
| 2015/0249845 A1 * | 9/2015 | Tirosh | H04H 60/05 725/62 |
| 2015/0319505 A1 * | 11/2015 | Patadia | H04N 21/23614 725/34 |

* cited by examiner

STREAMING CHANNEL SETUP

*Username: JohnSmith123*

Channel Name: John's Hiking-Only Channel

Channel Description: On this channel you can watch my live hiking videos, replays of my previously recorded live hiking videos, hiking streams from other hikers in Colorado, and other hiking programming!

Keywords: hiking, Colorado, live, video on demand, DVR, trails, backpacking, wilderness, trekking, outdoors, Rocky Mountain National Park ☑ Automatically fill schedule gaps from with live streams from Content Marketplace?
☑ Automatically fill schedule gaps from with DVR/VOD streams from Content Marketplace?
☑ Use only FREE items from Content Marketplace
☑ Automatically record channel content to network DVR (including shared content if permitted by content sharers)?

[ Save & Create Channel ]   [ Cancel ]

John's Hiking-Only Channel
*May 5, 2014 (Mountain Time)*

| | | |
|---|---|---|
| 8:00 am | Holiday Trek - JohnSmith123 - REPEAT | http://JohnSmith123.com/Recorded/Holiday.mp4 |
| 10:00 am | My hike outside Denver - COHiker99 – LIVE | http://COHiker.com:1935/live/smil:denver.smil/manifest.mpd |
| 2:00 pm | John reviews 2014 hiking boots - JohnSmith123 – LIVE | http://JohnSmith123.com:1935/live/2014Boots.m3u8 |
| 3:00 pm | www.livehikingstreams.com – HikingStreams – LIVE | http://livehikingstreams.com:1935/live/manifest.mpd |
| 7:00 pm | One with the Wilderness – MOVIE | http://freemovies.com/english/OWTW_hd.mp4/username=... |
| 10:00 pm | Holiday Trek – JohnSmith123 – REPEAT | http://JohnSmith123.com/Recorded/Holiday.mp4 |

*FIG. 4*

John's Hiking-Only Channel
*May 5, 2014 (Mountain Time)*

| Time | Program | URL |
|---|---|---|
| 8:00 am | Holiday Trek - JohnSmith123 - REPEAT | http://JohnSmith123.com/Recorded/Holiday.mp4 |
| 10:00 am | My hike outside Denver - COHiker99 -- LIVE | http://COHiker.com:1935/live/smil:denver.smil/manifest.mpd |
| 1:30 pm | Great Hikes in History -- "Episode 101: Abel Crawford" - TV | http://outdoorschannel.com/VOD/GreatHikes/101.mp4 |
| 2:00 pm | John reviews 2014 hiking boots - JohnSmith123 -- LIVE | http://JohnSmith123.com/live/2014Boots.m3u8 |
| 3:00 pm | www.hikingstreams.com -- HikingStreams -- LIVE | http://hikingstreams.com:1935/live/manifest.mpd |
| 7:00 pm | Hikers in the Void -- MOVIE | http://freemovies.com/english/HITV__hd.mp4/username=... |
| 10:00 pm | Holiday Trek -- JohnSmith123 -- REPEAT | http://JohnSmith123.com/Recorded/Holiday.mp4 |

*FIG. 5*

SCHEDULING VIDEO CONTENT FROM MULTIPLE SOURCES FOR PRESENTATION VIA A STREAMING VIDEO CHANNEL

CROSS-REFERENCE TO RELATED APPLICATIONS

The present application claims benefit of U.S. Provisional Application No. 62/209,685, filed Aug. 25, 2015, which is incorporated by reference herein in its entirety.

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones, Internet-enabled televisions, etc.). Various types of personal electronic devices are available to consumers. Different devices may have different screen sizes and may be compatible with different audio formats, video formats, streaming protocols, wireless connection speeds, etc.

Numerous streaming video services provide access to television program and movie streams. Such streams can be viewed on electronic devices, such as computers, tablets, smartphones, etc. Thus, media consumption via online streaming has become commonplace. Online streaming can also be used to view user-generated content instead of, or in addition to, television programs and movies. For example, a user can capture a live or pre-recorded stream using a camera on their mobile phone and upload the captured stream to a website. Some websites permit a user or a content provider to create a video "channel" that streams pre-recorded content generated by the user or content provider for viewing by other users. When a user has not generated a large amount of content, the viewers of the personal video channel may find the channel to be boring and/or repetitive. In addition, a content provider may have insufficient content to create a dedicated video channel for a narrow content preference (e.g., a movie studio may have content to create a "comedy" channel, but may have insufficient content to create a "1970s comedies" channel).

SUMMARY

With the increasing prevalence of online streaming, it would be beneficial to be able to create channels that are targeted towards individual users or towards "niche" (e.g., narrow) content preferences. For example, a television network that broadcasts outdoors programming (e.g., hiking, biking, rafting, etc.) may have an online channel that streams the same content as presented on the television network. However, the television network may not have sufficient content to provide a twenty-four hours a day video channel dedicated to only hiking, even though there may be viewers interested in viewing and/or subscribing to such a channel. Users may also be faced with a lack of content for personal video channels. For example, an avid hiker may not possess enough content to create a personal video channel dedicated to hiking.

The present application provides systems and methods of scheduling content, including the ability to schedule third-party content from different content providers, for presentation on a streaming video channel. For example, in accordance with the described techniques, to fill scheduling gaps on the hiking channel, a scheduler may search a content marketplace for video content (e.g., pre-recorded and/or live content) related to hiking. In one aspect, the content marketplace is searched using one or more search terms that are derived from a description of the channel (e.g., the search terms may include "hiking," "trekking," etc.). The scheduler may add such pre-recorded and/or live video content to the schedule for the hiking channel, along with any hiking-related content available from the television network's own content library.

In a particular implementation, the hiking channel may be available for viewing as a "live linear" stream. As used herein, a "live linear" stream is a stream that appears to be live from the point of view of a viewer of the stream (e.g., the viewer may "tune in to" the stream while the stream is in-progress and may not be able to rewind and/or fast-forward the stream), regardless of whether the live linear stream is actually presenting a live event or pre-recorded content. For example, a schedule for the hiking channel's live linear stream can include the television network's live, video on demand (VOD), or digital video recorder (DVR) hiking-related content during a first time period, and may include live, VOD, or DVR hiking-related content acquired via the content marketplace during a second time period. If information regarding the content acquired via the content marketplace changes (e.g., a third-party live stream is cancelled, delayed, etc.), the streaming schedule for the hiking channel can be modified accordingly. The present application thus enables scheduling of video content from multiple content providers for presentation on an online streaming channel.

BRIEF DESCRIPTION OF THE DRAWINGS

FIG. 3 is a diagram of a particular embodiment of a user interface operable to share content via a content marketplace;

FIG. 4 is a diagram to illustrate a particular embodiment of a streaming schedule generated by the system of FIG. 1;

FIG. 5 is a diagram to illustrate modifying the streaming schedule of FIG. 4;

DETAILED DESCRIPTION

Figure 1:
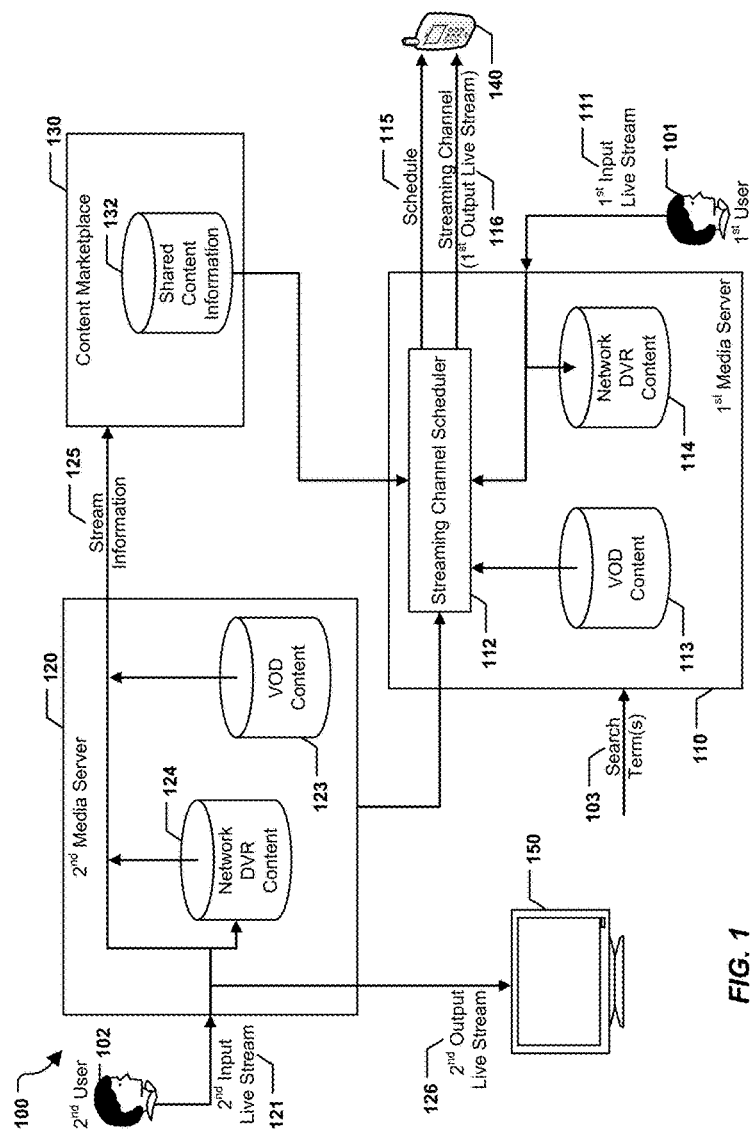
FIG. 1 is a diagram of a particular embodiment of a system that is operable to schedule video content from multiple sources for presentation via a streaming video channel.

Users have access to various types of media, such as film, television, radio, online audio/video streams, electronic books (eBooks), printed books, newspapers, magazines, newsletters, etc. Different types of media may have or support different amounts of "targeting." To illustrate, broadcast television, which is often aimed at a large audience that has varying demographic characteristics, has less targeting than a specialty magazine or newsletter that can be "hyper-targeted" to the niche interests of its subscribers. Although advertisers may be willing to pay a premium to advertise in such "hyper-targeted" media, the lack of relevant content may make it difficult to create dedicated twenty-four-hours a day television channels, radio stations, and online streaming channels that present "hyper-targeted" media. FIG. 1 illustrates a particular embodiment of a system 100 that supports scheduling of video content for presentation via a streaming channel 116 (e.g., an online streaming video channel), including the ability to identify and schedule third-party video content that is "hyper-targeted." The system 100 may thus enable acquisition of enough content to make a "hyper-targeted" online streaming channel (e.g., the streaming channel 116) viable. The online streaming channel may be associated with a business entity (e.g., a television station, a movie studio, etc.) or may be a personal video channel associated with an individual user. In a particular embodiment, the streaming channel 116 is a "live linear" stream. As used herein, a "live linear" stream is a stream that appears to be live from the point of view of a viewer of the stream (e.g., the viewer may "tune in to" the stream while the stream is in-progress and may not be able to rewind and/or fast-forward the stream), regardless of whether the live linear stream is actually presenting a live event or pre-recorded content.

The system 100 includes a first media server 110, a second media server 120, and a content marketplace 130. The content marketplace 130 may correspond to one or more systems or devices, as further described herein. In the example of FIG. 1, the first media server 110 is configured to generate the streaming channel 116 and/or a schedule 115 for the streaming channel 116. For example, to view the streaming channel 116, a viewer may use a device to access a uniform resource locator (URL) associated with the streaming channel 116, and the URL may terminate at the first media server 110.

To support dynamic scheduling of content to be presented by the streaming channel 116, the system 100 may enable devices to share live and pre-recorded (e.g., video on demand (VOD) and/or digital video recorder (DVR)) content, store information regarding shared content, and search the stored information for shared content that is of interest. In a particular embodiment, as further described herein, the streaming channel 116 presents content that is identified based on shared content information 132 stored at the content marketplace 130. The streaming channel 116 may be associated with a first user 101. For example, the streaming channel 116 may be a personal video channel that presents live and/or pre-recorded content that is curated by (or curated based on preferences of) the first user 101, and other users may view the streaming channel 116 by navigating a computing device to a uniform resource locator (URL) associated with the streaming channel 116. The shared content information 132 may include stream information 125 associated with live video stream(s) and/or pre-recorded video content that is available from the second media server 120, such as video content provided by a second user 102. Thus, as further described herein, the present disclosure enables dynamic scheduling of a user's content (e.g., content provided by the second user 102) for presentation on another user's streaming channel (e.g., the streaming channel 116 of the first user 101). It should be noted that in alternative embodiments, the media servers 110, 120 may be associated with different content providers (e.g., corporations, content producers, content distributors, licensors, movie studios, television networks, streaming media websites, etc.).

The media servers 110, 120 and the content marketplace 130 may each be configured to receive data from and to send data to various other devices (e.g., via a network, such as a local area network (LAN) or the Internet, using a wired or wireless network connection). The content marketplace 130 may be implemented using one or more network-accessible computing devices, such as servers, personal computers, network-attached storage devices, cloud computing devices, etc. Thus, operations described herein as being performed by the content marketplace 130 may be performed by one or more computing devices corresponding to the content marketplace. Further, operations described as being performed by one of the media servers 110, 120 may also be capable of being performed by the other media server. Moreover, it should be noted that although certain operations may be described herein as being performed by a media server, in alternative embodiments such operations may be performed by one or more other types of devices, including but not limited to, desktop computers, laptop computers, smartphones, tablet computers, cloud servers, etc.

Each of the media servers 110, 120 may be configured to receive live and pre-recorded content, process the content, and stream the content to one or more destination devices. In the example of FIG. 1, the first media server 110 is illustrated as receiving a first input live stream 111 from the first user 101 (e.g., from a computing device associated with the first user 101), and the second media server 120 is illustrated as receiving a second input live stream 121 from the second user 102 (e.g., from a computing device associated with the second user 102). Live streams may be received from a stream capture device (e.g., a camera), a video encoder, or another computing device (e.g., another media server), as illustrative non-limiting examples.

The media servers 110, 120 may be configured to provide output streams to destination devices for playback. Examples of such destination devices may include, but are not limited to, laptop computers, desktop computers, portable media players, smartphones, tablet computers, set-top boxes, televisions, game consoles, devices included in other automotive vehicles, etc. In the example of FIG. 1, the first media server 110 provides the streaming channel 116 to a first destination device 140. As described above, the streaming channel 116 may be a live linear output stream. The second media server 120 may similarly provide a second output live stream 126 to a second destination device 150. In the example of FIG. 1, the second output live stream 126 corresponds to (e.g., is generated from) the second input live stream 121. In a particular embodiment, the second output live stream 126 is a live linear output stream.

The media servers 110, 120 may also provide output streams to destination devices based on VOD content or DVR content. To illustrate, the media servers 110, 120 may store VOD content 113, 123 and network DVR content 114, 124, respectively. The VOD content 113, 123 and the DVR content 114, 124 may be stored in one or more data storage devices that are part of or coupled to the respective media servers 110, 120. VOD content may include television programs, movies, and other video content received by a media server, such as from a VOD database or server, a content delivery network (CDN) server, etc. VOD content may be received via hypertext transfer protocol (HTTP), network file system (NFS)-mounted disk, etc. Network DVR content may include recorded versions of live video streams that a media server is receiving or has previously received. A network DVR thus enables time-shifted presentation of a live stream in its entirety by functioning as a time delay cache/buffer for the live stream. For example, the network DVR content 114 may include a recorded version of the first input live stream 111, and the network DVR content 124 may include a recorded version of the second input live stream 121. VOD content and network DVR content may be streamed to destination devices using live linear streams (e.g., the streaming channel 116) and/or using streams that support various trick-play functionality (e.g., rewinding, fast-forwarding, pausing, restarting, etc.).

In particular examples, as further described with reference to FIG. 7, the media servers 110, 120 may perform transcoding operations to generate output streams. The transcoding operations may include, but are not limited to, bitrate conversion, coder/decoder (CODEC) conversion, frame size conversion, etc. As further described with reference to FIG. 7, the media servers 110, 120 may also provide output streams for adaptive bitrate (ABR) streaming, including generating multiple ABR renditions of a stream, where each rendition has a distinct bitrate (e.g., video bitrate and/or audio bitrate). Renditions may also differ from each other with respect to other video and audio quality parameters, such as frame size, frame rate, video CODEC, audio CODEC, number of audio channels, etc.

FIG. 1 illustrates an example of the second media server 120 sharing content via the content marketplace 130. The content marketplace 130 may store shared content information 132 (e.g., in one or more data storage devices). The shared content information 132 may include information related to live, VOD, and/or network DVR content that the creators, distributors, and/or owners of such content have decided to share via the content marketplace 130. For example, the second user 102 associated with the second media server 120 may decide to share the second input live stream 121 via the content marketplace 130. To share the second input live stream 121, the second user 102 may send the stream information 125 to the content marketplace 130, where the stream information 125 describes the second input live stream 121 (e.g., the stream information 125 may include a stream name, a stream description, keywords, price information, license information, a start time, a stop time, a stream URL, etc.).

Alternatively, the stream information 125 may be automatically generated by the second media server 120, such as based on a user preference to automatically share the second input live stream 121 (or all input live streams) or based on information (e.g., metadata) included in the second input live stream 121.

Similarly, if the first user 101 elects to share items in the VOD content 113, the network DVR content 114, or live streams (e.g., the input live stream 111), information regarding such shared content (e.g., a stream name, a stream description, keywords, price information, license information, a start time, a stop time, a stream URL, etc.) may be sent from the first media server 110 to the content marketplace 130.

It should be noted that although the term "marketplace" is used in descriptions herein regarding the content marketplace 130, such terminology is not to be construed as requiring that content have an associated fee. In some embodiments, the content marketplace 130 may store information regarding shared content that is freely available instead of or in addition to shared content that is available for a fee. Moreover, in selected embodiments, the content marketplace 130 may store information regarding content available from different types of content sources including, but not limited to, public online streaming websites, websites operated by television channels, websites operated by movie studios, free and/or pay-per-view content repositories/databases, content that is shared via one or more social networks or other social media outlets, etc.

Figure 2:
FIG. 2 is a diagram of a particular embodiment of a user interface operable to configure a streaming video channel.

In a particular embodiment, when an in-progress live stream or a live stream that is scheduled to start in the future is shared, the shared content information 132 for the live stream includes a description of the live stream, scheduled start and stop times for the live stream, a uniform resource locator (URL) via which the live stream can be accessed by another device (e.g., the first media server 110), fee/license information regarding the live stream, etc. When VOD content or network DVR content is shared, the shared content information 132 for such content may include a description, a content URL, fee/license information, etc. An exemplary user interface that may be used to share content via the content marketplace 130 is illustrated in FIG. 2. In the example of FIG. 2, a user having the username "COHiker99" (e.g., the second user 102) is sharing a live video stream (e.g., the second input live stream 121) using an interface 200. In an illustrative embodiment, the interface 200 is generated by the second media server 120 and sent to a computing device associated with the second user 102 for display. The interface 200 may be a displayed by the computing device in a web browser after the second user 102 logs in to the second media server 120 using the computing device (e.g., by using the web browser to access a web page associated with the second media server 120 and to enter authorization credentials, such as a username and a password, at the web page).

As shown in FIG. 2, the second user 102 plans on capturing a live video stream while hiking outside of Denver, Colo. The live video stream is scheduled to start at 10 am Mountain Time on May 5, 2014 and is scheduled to end at 2:00 pm Mountain Time on the same day. The interface 200 also enables the user to provide a URL via which the live stream is available (if the live stream has already started) or will be available (if the live stream has not yet started). The interface 200 is also operable to receive fee and license information for the stream that is being shared. In the example of FIG. 2, the shared stream is free and is indicated as being available for non-commercial use with attribution. The user may also enter a name, a description, and keywords regarding the shared stream, as shown. In an illustrative embodiment, the stream information 125 is generated based on some or all of the information included in the interface 200. In a particular embodiment, the stream information 125 also indicates whether another user or device is permitted to locally record (e.g., provide network DVR time-shifted access to) the shared stream. In a particular embodiment, the stream information 125 may also include location information (e.g., global positioning system (GPS) information indicating that the stream was captured, is being captured, or will be captured outside Denver, Colo.).

After live, VOD, or DVR content is shared by a user, other users (or computing devices associated with the other users) may identify the shared content and schedule the shared content for presentation on their own streaming channels. For example, the first media server 110 includes a streaming channel scheduler 112 that is configured to generate the schedule 115 for the streaming channel 116 of the first user 101. In an illustrative embodiment, the streaming channel scheduler 112 corresponds to hardware, software (e.g., instructions executable by one or more processors), or a combination thereof. In the following description, the first user 101 is interested in hiking and the streaming channel 116 is a hiking-only channel. However, it is to be understood that different content may be scheduled for different streaming channels in alternative examples.

The first media server 110 may receive search term(s) 103 associated with the hiking-only streaming channel 116. For example, the search term(s) 103 may be received when the first user 101 sets up the streaming channel 116. To illustrate, referring to FIG. 3, the first user 101 may use an interface 300 to set up the hiking-only streaming channel 116, and the search term(s) 103 may include terms from the interface 300. In an illustrative embodiment, the interface 300 is generated by the first media server 110 and sent to a computing device associated with the first user 101 for display. The interface may 300 be a displayed by the computing device in a web browser after the first user 101 logs in to the first media server 110 using the computing device (e.g., by using the web browser to access a web page associated with the first media server 110 and to enter authorization credentials, such as a username and a password, at the web page).

In the illustrated example, the first user 101 has the username "JohnSmith123" and may use the interface 300 to enter a channel name, channel description, and keywords associated with the streaming channel 116. As shown in FIG. 3, the first user 101 has elected to automatically fill scheduling gaps in the streaming channel 116 using live streams, DVR streams, and VOD streams offered via the content marketplace 130. The user has restricted the streaming channel scheduler 112 to using free content from the content marketplace, and has elected to automatically add content that is aired on the streaming channel 116 to the network DVR content 114, including shared content if permitted, so that such content can be replayed on the streaming channel 116 in the future. The search term(s) 103 may include one or more of the user's name (e.g., "JohnSmith123"), the channel name, the channel description, the keywords, "live," "VOD," "DVR," "free," etc. Although not shown in FIG. 3, the user may also use the interface 300 to enter preferences regarding licensing terms for content acquired via the content marketplace 130, and the search term(s) 103 may also include corresponding licensing terminology, such as "commercial use," "non-commercial use," "with attribution," "without attribution," "public domain," etc.

After the streaming channel 116 is configured, the streaming channel scheduler 112 may generate the schedule 115 for the streaming channel 116. Based on the schedule 115, the streaming channel 116 may present "local" content (e.g., the VOD content 113, the network DVR content 114, and/or live content received via a local live stream, such as the first input live stream 111) during certain time periods. During other time periods, the streaming channel 116 may present "remote" content that is available from another (e.g., third-party) content source. In an illustrative example, the streaming channel scheduler 112 determines that the second input live stream 121 (which was shared by the second user 102 using the interface 200 of FIG. 2, as explained above) is related to hiking, and therefore is of interest with respect to the streaming channel 116. The streaming channel scheduler 112 may add the shared stream to the schedule 115 for the hiking-only streaming channel 116. A live stream may be added to a schedule for a streaming channel prior to the start of the live stream or after the live stream has started (e.g., as an in-progress live stream).

A first example of the schedule 115 for the hiking-only streaming channel 116 is shown in FIG. 4. In the example of FIG. 4, the schedule indicates that "Holiday Trek" from the first user's network DVR content 114 will be presented on the streaming channel 116 on May 5, 2014 from 8:00 am to 10:00 am. The schedule 115 also indicates that the shared live stream (e.g., the live stream 121 or the live stream 126) from the second user 102 (indicated as "My hike outside Denver—COHiker99") will be presented on the streaming channel 116 from 10:00 am to 2:00 pm. A live stream (e.g., the live stream 111) from the first user 101 (indicated as "John reviews 2014 hiking boots—JohnSmith123") is scheduled from 2:00 pm to 3:00 pm, a live hiking stream from a syndicated content source (e.g., "livehikingstreams.com") is scheduled from 3:00 pm to 7:00 pm, a movie entitled "One with the Wilderness" is scheduled from 7:00 pm to 10:00 pm, and the "Holiday Trek" network DVR content item is scheduled to repeat at 10:00 pm. Thus, as shown in FIG. 4, the schedule 115 includes pre-recorded video content provided by the first user 101, live video content provided by the first user 101, pre-recorded video content provided by a third-party, and live video content provided by a third-party.

In a particular embodiment, the first media server 110 retrieves content indicated by the schedule 115 and inserts the content into the live linear output stream corresponding to the streaming channel 116. For example, at 8:00 am Mountain Time on May 5, 2014, the streaming channel scheduler 112 may retrieve the "Holiday Trek" content item from the network DVR content 114, generate an output video stream from the content item, and provide the output video stream at the URL corresponding to the streaming channel 116. In a particular embodiment, generating the output video stream may include transcoding operations to generate multiple adaptive bitrate (ABR) renditions of the content item, as further described with reference to FIG. 7. The output video stream may be sent by the first media server 110 to destination devices, such as the destination device 140, which are "tuned to" the streaming channel 116 (e.g., accessing a URL corresponding to the streaming channel 116). At 10:00 am Mountain Time on May 5, 2014, the streaming channel scheduler 112 may retrieve COHiker99's live stream using the URL entered by the second user 102 into the interface 200. The first media server 110 may re-broadcast the received stream on the streaming channel 116. Thus, from the perspective of a viewer at the destination device 140, the streaming channel 116 may seamlessly transition from a live linear presentation of "Holiday Trek" to a live linear presentation of CoHiker99's live stream.

In an alternative embodiment, the schedule 115 includes information that enables destination devices to retrieve content for the streaming channel 116. For example, the schedule 115 may include stream URLs, as shown in FIG. 4. In this embodiment, at 10:00 am Mountain Time on May 5, 2014, the destination device 140 may retrieve COHiker99's live stream using the URL "http://COHiker.com:1935/live/smil:denver.smil/manifest.mpd." It is noted that if COHiker99's live stream were captured from 9:30 am to 1:30 pm instead of from 10:00 am to 2:00 pm, the streaming channel schedule 112 may nonetheless schedule an entirety of CoHiker99's live stream for presentation via the streaming channel by utilizing a time-shifted version of the live stream from the network DVR content 124 at the second media server 120. When the live (or time-shifted DVR) stream ends, the destination device 140 may retrieve the next stream on the schedule 115. In a particular embodiment, if a streaming channel schedule does not include timing information (e.g., start times or stop times), a destination device may treat the streaming channel schedule as a linear playlist and may retrieve content items sequentially according to the URLs in the schedule. In some examples, the schedule 115 may include additional information that is used by destination devices to receive video content, such as a username/ password combination that enables access to syndicated content repositories, etc.

In a particular embodiment, the streaming channel scheduler 112 is configured to adjust the schedule 115 of content that is to be presented on the streaming channel 116 in response to input from the first user 101. For example, the as shown in FIG. 5, the first user 101 may change the 7:00 pm movie from "One with the Wilderness" to "Hikers in the Void." The streaming channel scheduler 112 may also dynamically adjust the schedule 115 in response to stream information updates. For example, if COHiker99's live stream ends at 1:30 pm instead of 2:00 pm, the streaming channel scheduler 112 may receive a cancellation notice from the content marketplace 130 (e.g., via a push notification). In response, the streaming channel scheduler 112 may automatically fill the 30 minute gap in the schedule 115 using other hiking-related content that is available at the first media server 110 or that is identified via the content marketplace 130. To illustrate, as shown in FIG. 5, the schedule 115 may be automatically adjusted to add a third-party VOD television show "Great Hikes in History—'Episode 101: Abel Crawford'" from 1:30 pm to 2:00 pm. The streaming channel scheduler 112 may thus update streaming schedules in response to input received from a user (e.g., the first user 101) or updated stream information received from the content marketplace 130. As illustrative non-limiting examples, schedules may be dynamically updated in real-time or near-real-time when updated stream information indicates that content is no longer available, is delayed, has a modified duration, has a modified start time, has a modified stop time, has a modified fee, has a modified license, or any combination thereof.

The system 100 of FIG. 1 thus enables dynamic scheduling of video content for presentation on a streaming channel, including video content from both local and third-party content sources. It will be appreciated that the system 100 may thus enable a user or other entity to automatically create and syndicate customized hyper-targeted video channels (e.g., the hiking-only streaming channel 116). The system 100 of FIG. 1 may be used to implement an ecosystem in which content, regardless of location and ownership, can be discovered and syndicated if the owner of the content elects to share the content.

In a particular embodiment, the media servers 110, 120 may support an application programming interface (API) that enables external users to programmatically draw from other live streams, VOD content, and network DVR content to construct a live linear output video stream on the fly. In a particular embodiment, the media servers 110, 120 may automatically push stream information to other media servers and/or to the content marketplace 130 in response to certain events (e.g., when a live stream is received, when VOD content is received, when network DVR content is stored, when video content is transcoded, etc.).

In a particular embodiment, the system 100 described with reference to FIGS. 1-5 may support searching for shared content based on other types of information. As an illustrative, non-limiting example, the streaming channel scheduler 112 may retrieve additional information associated with the first user 101, such as information from social networking profiles, social network friends' profiles, etc. The streaming channel scheduler 112 may use the retrieved information instead of or in addition to the search term(s) 103 determined from the interface 300 of FIG. 3. Thus, the system 100 may enable dynamic scheduling of video content for a "personal" video channel for the first user 101 based on his/her interests, a "friends" video channel for the first user 101 and his/her friends based on their collective interests, etc. In additional examples, the streaming channel 116 may be a hyper-targeted video channel that presents continuing educational videos for a professional group, a custom channel for a social networking fan club of a particular actress/ actress/television show/movie, etc. As yet another example, the system 100 may be used to dynamically deliver and track targeted advertising to different groups of viewers, support monetization of the content being shared via the content marketplace 130, and provide a method of tracking and reporting a number/duration of content views, including shared content views on other streaming channels.

Figure 6:
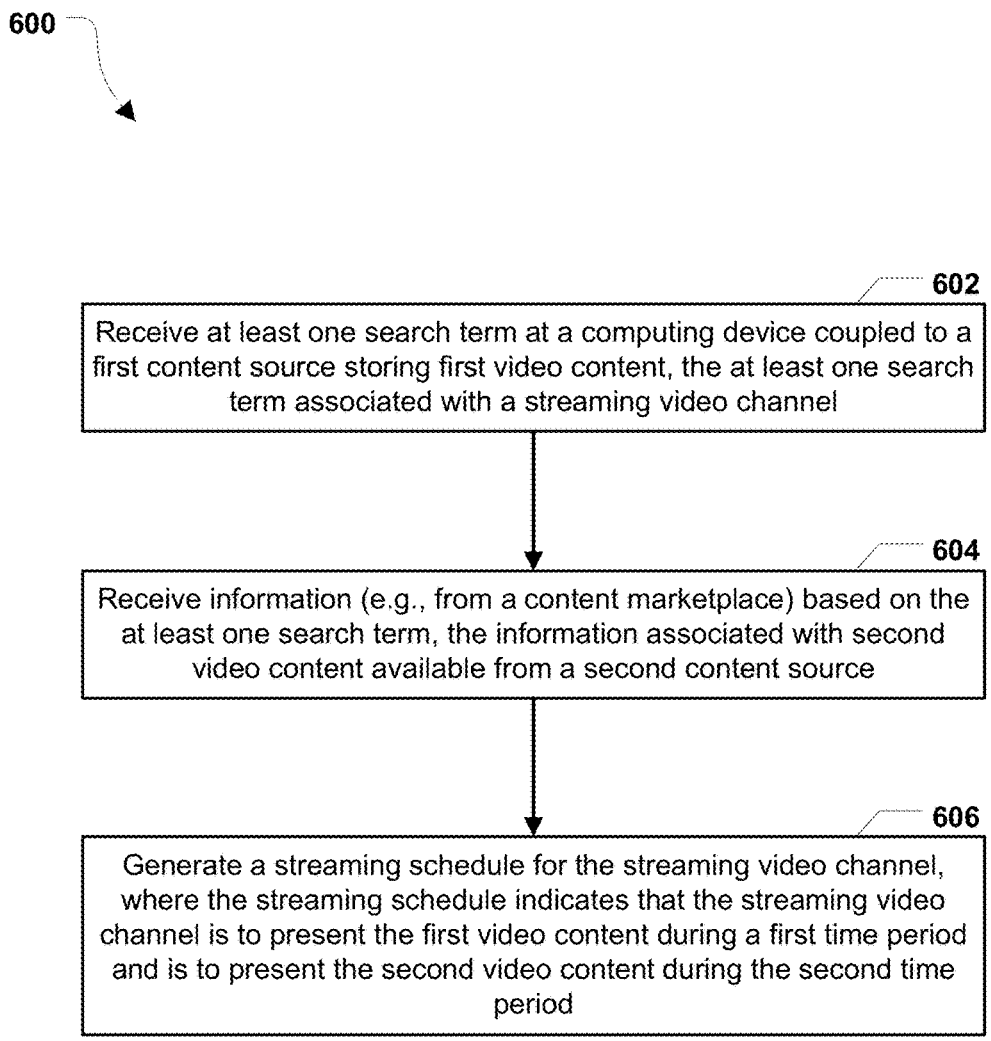
FIG. 6 is a flowchart of a particular embodiment of a method of scheduling video content from multiple sources for presentation via a streaming video channel.

FIG. 6 illustrates a particular embodiment of a method 600 of operation at the system 100. In an illustrative example, the method 600 may be performed by the media server 110 or the media server 120.

The method 600 includes receiving at least one search term at a computing device, at 602. The computing device is coupled to a first content source that stores first video content. The at least one search term is associated with a streaming video channel. For example, referring to FIG. 1, the first media server 110 may receive the search term(s) 103 associated with the streaming channel 116. The first media server 110 may be coupled to a first content source (e.g., a source of the first input live stream 111, the VOD content 113, and/or the network DVR content 114). The search term(s) 103 may be received based on user input and/or may be generated automatically, such as based on information (e.g., keywords) associated with the streaming channel 116 or stream information (e.g., the stream information 125) that is automatically extracted from content that has previously been played on the streaming channel 116.

The method 600 also includes receiving information (e.g., from a content marketplace) based on the at least one search term, at 604. The information is associated with second video content available from a second content source. For example, referring to FIG. 1, the first media server 110 may receive information from the content marketplace 130, where the information describes video content that is available from the second media server 120.

The method 600 further includes generating a streaming schedule for the streaming video channel, at 606. The streaming schedule indicates that the streaming video channel is to present the first video content during a first time period and is to present the second video content during the second time period. For example, the first media server 110 may generate the schedule of FIG. 4, which indicates that the streaming channel 116 is to present the "Holiday Trek" content item from the network DVR content 114 from 8:00 am to 10:00 am Mountain Time on May 5, 2014, followed by presenting the shared live stream from the second media server 120 between 10:00 am and 2:00 pm.

Figure 7:
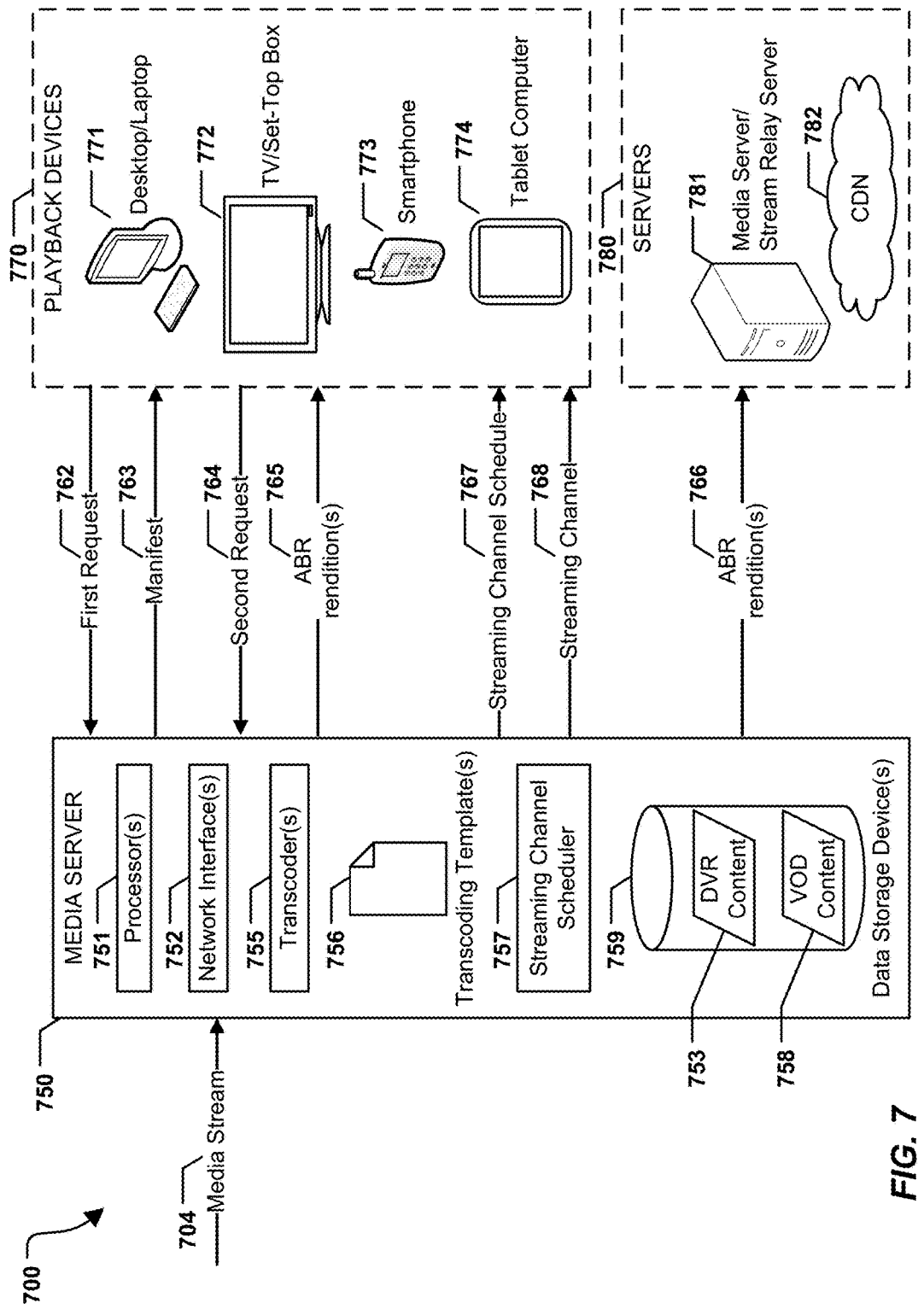
FIG. 7 is a diagram to illustrate another particular embodiment of a system that is operable to schedule video content from multiple sources for presentation via a streaming video channel.

FIG. 7 illustrates another particular embodiment of a system 700 operable to schedule content for presentation on a streaming channel. The system 700 includes a media server 750, which in an illustrative embodiment may be the media server 110 of FIG. 1 or the media server 120 of FIG. 1. The media server 750 may receive a media stream 704 via one or more stream capture sources (e.g., a camera or a video encoder) or via one or more media content servers (e.g., a VOD database or server, a network DVR database or server, or a server of a content delivery network (CDN)). Accordingly, the media stream 704 may include a live stream, a VOD stream, or a DVR stream. The media server 750 is configured to receive and send data from various other devices (e.g., via a network, such as a LAN or the Internet, via a wired or wireless network connection). For example, the media server 750 may communicate with one or more playback devices 770 (e.g., devices configured to output a display of a stream of live/VOD/DVR content) and one or more other servers 780. The one or more playback devices 770 and/or the one or more other servers 780 may correspond to the destination devices 140, 150 of FIG. 1.

The media server 750 may include one or more processor(s) 751 and various components that are executable by the processor(s) 751. The media server 750 may include software application(s) that perform media serving or processing, hardware systems (e.g., servers) that support or perform media serving and processing, or any combination thereof. Thus, various operations described with reference to the media server 750, or components thereof, may be implemented using hardware, software (e.g., instructions executable by the processor(s) 751), or any combination thereof.

The media server 750 may include one or more network interface(s) 752. For example, the network interface(s) 752 may include input interface(s) and output interface(s) that are configured to receive data and to send data, respectively. In a particular embodiment, the network interface(s) 752 may be wired and/or wireless interfaces that enable the media server 750 to communicate data via a network, such as the Internet. For example, the network interface(s) 752 may include an Ethernet interface, a wireless interface compatible with an Institute of Electrical and Electronics Engineers (IEEE) 802.11 (e.g., Wi-Fi) protocol, or other wired or wireless interfaces.

The media server 750 may support multiple coding technologies and protocols. For example, the media server 750 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 750 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 750 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 750 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 750 may also include one or more transcoder(s) 755. The transcoder(s) 755 may be configured to transcode the media stream 704 to generate multiple ABR rendition(s) 765 of the media stream 704. The ABR rendition(s) 765, or portions thereof, may be stored at one or more data storage device(s) 759. The data storage device(s) 759 may also include VOD content 758 and DVR content 753. In an example, the transcoder(s) 755 may transcode the VOD content 758 (or the DVR content 753) to generate multiple ABR renditions of the VOD content 758 (or the DVR content 753), so that the media server 750 may provide VOD streams (or DVR streams) to one or more of the playback devices 770.

The ABR rendition(s) 765 of the media stream 704 may correspond to different quality renditions of the media stream 704. For example, the transcoder(s) 755 may generate a high-quality ABR rendition of the media stream 704 and/or may generate a lower-quality ABR rendition of the media stream 704 that is suitable for streaming in low-bandwidth network conditions. The transcoder(s) 755 may be configured to perform bitrate conversion, CODEC conversion, frame size conversion, etc. Moreover, such transcoding may be performed in response to requests from the playback devices 770. Thus, the media server 750 may be able to generate multiple ABR rendition(s) 765 of the media stream 704 for different playback devices 770 experiencing different network conditions.

The one or more ABR rendition(s) 765 may be sent to the one or more playback devices 770. For example, depending on a playback format supported by a requesting playback device 770, and/or transcoding parameters in use by the transcoder(s) 755, the media server 750 may send one or more ABR renditions to the playback devices 770 based on requests received from the playback devices 770. In a particular embodiment, parameters used by the transcoder(s) 755 are stored in one or more transcoding template(s) 756. For example, the transcoding template(s) 756 may be computer-readable files (e.g., eXtensible markup language (XML) files) that define transcoding parameters (e.g., bitrate, type of CODEC, etc.) for various stream renditions.

The media server 750 may also include a streaming channel scheduler 757, which may operate as described with reference to the streaming channel scheduler 112 of FIG. 1. During operation, the media server 750 may perform transcoding of the media stream 704, the VOD content 758, and/or the DVR content 753 for adaptive streaming. As described above, adaptive streaming is a media transmission mechanism that enables a receiving device to dynamically request different versions of a stream in response to changing network conditions. For example, one of the playback devices 770 (e.g., a desktop or laptop computing device 771, a television or set-top box 772, a smartphone 773, or a tablet computer 774) may initiate an adaptive streaming session with the media server 750 for the media stream 704 by sending a first request 762. In an illustrative example, the first request 762 is generated in response to a user selecting a link to the media stream 704 (e.g., on a webpage), where the link specifies an Internet address of the media server 750. The media server 750 may send a manifest 763 to the initiating device (e.g., the computing device 771) in response to the first request 762. The manifest 763 may include information describing each of the plurality of ABR rendition(s) 765 (if any) of the media stream 704. For example, the transcoding template(s) 756 may define particular available ABR rendition(s) 765 of the media stream 704 and the manifest 763 may be automatically generated based on the transcoding template(s) 756.

Upon receiving the manifest 763, the computing device 771 may determine which (if any) of the available ABR rendition(s) 765 of the media stream 704 should be requested from the media server 750. For example, the computing device 771 may make such a determination based on buffering/processing capability at the computing device 771 and/or network conditions being experienced by the computing device 771. Upon determining which ABR rendition should be requested, the computing device 771 may transmit a second request 764 to the media server 750. The second request 764 may specify a particular ABR rendition of the media stream 704. If there are no problems with receipt and playback of the requested ABR rendition of the media stream 704, the computing device 771 may continue to receive the requested ABR rendition of the media stream 704 for continued playback. However, if playback and/or network conditions become worse, the computing device 771 may switch to a lower bitrate rendition by requesting a lower bitrate ABR rendition of the media stream 704. Conversely, if playback and/or network conditions improve, the computing device 771 may switch to a higher bitrate rendition. The transcoder(s) 755 may generate key frame aligned portions for the adaptive streaming renditions, so that switching to a lower bitrate or higher bitrate ABR rendition appears "seamless" (e.g., does not result in noticeable visual glitches or dropped frames at a playback device 770, such as the computing device 771, the television/set-top box 772, the smartphone 773, or the tablet computer 774).

Thus, during an adaptive streaming session, the media server 750 may receive the second request 764 from the computing device 771 for a particular ABR rendition (or "chunk" thereof) of the media stream 704. Upon receiving the second request 764, the media server 750 may check whether the requested ABR rendition (or chunk) is stored in the data storage device(s) 759. If so, the media server 750 may respond to the second request 764 by retrieving the requested ABR rendition (or chunk) from the data storage device(s) 759 and transmitting the retrieved ABR rendition (or chunk) to the computing device 771. If the requested ABR rendition (or chunk) is not available from the data storage device(s) 759, the transcoder(s) 755 may generate the requested ABR rendition (or chunk) by transcoding the media stream 704 (or a portion thereof), and the generated ABR rendition (or chunk) may be transmitted to the computing device 771 in response to the second request 764. The generated ABR rendition (or chunk) may also be cached at the data storage device(s) 759 for subsequent retrieval. In a particular embodiment, sending the ABR rendition(s) 765 to the computing device 771 includes encoding and/or encapsulating the generated ABR rendition(s) 765 in accordance with the adaptive streaming protocol being used by the computing device 771 (e.g., HLS, HDS, smooth streaming, MPEG-DASH, etc.). As additional adaptive streaming requests are received from the computing device 771 for the same or other renditions of the VOD item, the transcoder(s) 755 may generate the additional ABR rendition(s) (or chunks) on the fly as needed.

The media server 750 may also receive a request from a playback device 770 for a streaming channel 768 or for a schedule 767 of the streaming channel 768. In an illustrative example, the schedule 767 is the schedule 115 of FIG. 1 and the streaming channel 768 is the streaming channel 116 of FIG. 1. The schedule 767 may indicate that the streaming channel 768 is to present "local" content available at the media server 750 (e.g., the media stream 704, the VOD content 758, and the DVR content 753) during some time periods. The schedule 767 may also indicate that during other time periods, the streaming channel 768 is to present "remote" content available from other content sources. In an illustrative example, the streaming channel scheduler 757 identifies such content by searching a content marketplace, such as the content marketplace 130 of FIG. 1. In a particular embodiment, the streaming channel scheduler 757 generates the streaming channel 768 by retrieving content based on the schedule 767 and sends a live linear video stream corresponding to the streaming channel 768 to a destination device. Alternatively, the streaming channel scheduler 757 may send the schedule 767 to a destination device, where the schedule 767 includes information (e.g., stream URLs) that enables the destination device to retrieve video streams from various content sources. In a particular embodiment, the streaming channel 768 is available for adaptive streaming, as described with reference to the manifest 763 and the ABR rendition(s) 765. Moreover, in a particular embodiment, the systems and methods of the present disclosure support simultaneously presenting both "local" and "remote" content on a streaming channel. For example, the schedule 757 may indicate that, during a particular time period, the streaming channel 768 is to concurrently present "local" live, VOD, or network DVR content (that is available from the media server 750) as well as "remote" live, VOD, or network DVR content (that is available from an external content source and that was identified based on the content marketplace 130). In this scenario, the media server 750 may retrieve the local content and the remote content, and may generate a composite stream that includes both the local content and the remote content. Illustrative non-limiting examples of such simultaneous content presentation can include a stream that includes side-by-side or picture-in-picture (PinP) presentation of the local and remote content, a stream that includes local video and remote audio (or vice versa), etc.

The described techniques may also be used to generate and transmit the schedule 767 and/or multiple ABR rendition(s) 766 of the media stream 704, the VOD content 758, the DVR content 753 and/or the streaming channel 768 to other servers 780. For example, the media server 750 may transmit a streaming channel schedule and/or ABR renditions to another media server 781, a stream relay server, and/or to a server (e.g., an edge server) of a content delivery network (CDN) 782. To illustrate, the streaming channel 768 may be sent to edge servers of the CDN 782 to make the streaming channel 768 more readily available to viewers in different geographic regions. In a particular embodiment, requested content at the CDN 782 may be set up using a pull through caching mechanism. The CDN 782 may include one or more edge HTTP caching servers. If a cache miss for requested content occurs at a caching server, the caching server may pull the requested content from the media server 750, which acts as an origin server. FIG. 7 thus illustrates a system 700 in which the media server 750 is configured to schedule live and pre-recorded content for presentation on a streaming channel, including support for simultaneous ABR streaming of the streaming channel to multiple playback devices/servers.

In view of the foregoing, it will be appreciated that techniques of the present disclosure may improve functionality at one or more computing devices. For example, in accordance with the present disclosure, the first media server 110 may have the ability to automatically discover content and fill scheduling gaps in the streaming channel 116. The first media server 110 may also have the ability to automatically adjust the schedule 115 in response to changes in content start time, stop time, duration, etc. The systems and methods of the present disclosure thus provide a multi-device ecosystem (e.g., including content capture devices associated with the users 101, 102, the media servers 110, 120, the content marketplace 130, and the destination devices 150, 160) in which content can be discovered, shared, syndicated, and formatted for viewing (e.g., via ABR streaming) regardless of the location and type of content capture device, destination/viewing device, etc.

It should be noted that the order of steps or operations described with reference to FIGS. 1-7 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. Thus, although one or more devices may be illustrated as being connected to one or more other devices via a line, it is to be understood that such a connection may be a wired and/or wireless connection that may include one or more public and/or private networks. In some examples, the computer system or components thereof may include or may be included within any one or more of the media server 110 of FIG. 1, the media server 120 of FIG. 1, the content marketplace 130 of FIG. 1, the destination device 140 of FIG. 1, the destination device 150 of FIG. 1, a computing device associated with the first user 101 of FIG. 1, a computing device associated with the second user 102 of FIG. 1, the media server 750 of FIG. 7, the desktop/laptop computing device 771 of FIG. 7, the TV/set-top box 772 of FIG. 7, the smartphone 773 of FIG. 7, the tablet computer 774 of FIG. 7, the media server/stream relay server 781 of FIG. 7, a server (e.g., edge server) of the CDN 782 FIG. 7, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "VOD" stream and a "DVR" stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. As described above, the systems and methods of the present disclosure may be used in conjunction with "live linear" streams, which may include a live feed, or a VOD asset or a DVR asset being rebroadcast as a live feed. It should also be noted that although certain embodiments may be described herein with reference to video on demand content or digital video recorder content, not all of the described techniques may require video content/data. Certain embodiments may also be used with content that does not include video (e.g., audio on demand, radio content, music streams, etc.). Live linear streams that present "hyper-targeted" content or that are presented less than twenty-four hours a day may alternatively be referred to as mini linear ("minear") streams.

In a particular embodiment, a method includes receiving at least one search term at a computing device coupled to a first content source storing first video content, the at least one search term associated with a streaming video channel. The method also includes receiving information based on the at least one search term, the information associated with second video content available from a second content source. The method further includes generating a streaming schedule for the streaming video channel. The streaming schedule indicates that during a first time period, the streaming video channel is to present the first video content from the first content source. The streaming schedule also indicates that, during a second time period, the streaming video channel is to present the second video content available from the second content source.

In another particular embodiment, an apparatus includes a processor and a memory storing instructions executable by the processor to perform operations including receiving at least one search term at a computing device coupled to a first content source storing first video content, the at least one search term associated with a streaming video channel. The operations also include receiving information based on the at least one search term, the information associated with second video content available from a second content source. The operations further include generating a streaming schedule for the streaming video channel. The streaming schedule indicates that during a first time period, the streaming video channel is to present the first video content from the first content source. The streaming schedule also indicates that, during a second time period, the streaming video channel is to present the second video content available from the second content source.

In another particular embodiment, a computer-readable storage device stores instructions that, when executed by a computer, cause the computer to perform operations that include receiving at least one search term at a computing device coupled to a first content source storing first video content, the at least one search term associated with a streaming video channel. The operations also include receiving information based on the at least one search term, the information associated with second video content available from a second content source. The operations further include generating a streaming schedule for the streaming video channel. The streaming schedule indicates that during a first time period, the streaming video channel is to present the first video content from the first content source. The streaming schedule also indicates that, during a second time period, the streaming video channel is to present the second video content available from the second content source.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a first time, a search term at a computing device coupled to a first content source storing first video content, the search term related to metadata of the first video content, wherein the first video content is associated with a first user;
   receiving information based on the search term, the information identifying second video content available from a second content source, the second video content available for streaming at a second time following the first time, wherein the second video content is associated with a second user; and
   determining a streaming schedule of a streaming video channel to present content related to the search term, wherein the streaming schedule spans a time period including the second time, and wherein determining the streaming schedule includes:
      adding an identifier of the first video content to the streaming schedule;
      identifying a scheduling gap in the streaming schedule, the scheduling gap corresponding to the second time; and
      in response to identifying the scheduling gap, adding an identifier of the second video content to the streaming schedule to fill the scheduling gap.

2. The method of claim 1, wherein the first content source comprises a data storage device storing video on demand (VOD) content or digital video recorder (DVR) content, a media server, a content delivery network server, a capture device configured to capture a media stream, or any combination thereof.

3. The method of claim 1, wherein the streaming video channel corresponds to a live linear video stream, the method further comprising:
   making available, to other computing devices, a uniform resource locator of the streaming video channel.

4. The method of claim 1, wherein the information includes fee information, license information, a start time, a stop time, or any combination thereof, and wherein the streaming schedule is based on a selection of a video of the second video content.

5. The method of claim 1, wherein the second video content comprises video on demand (VOD) content or digital video recorder (DVR) content.

6. The method of claim 1, wherein the second video content comprises a live linear video stream.

7. The method of claim 6, wherein the second video content is scheduled to start at the second time.

8. The method of claim 6, wherein the second video content has a scheduled start time prior to the second time.

9. An apparatus comprising:
   a processor; and
   a memory storing instructions that, when executed by the processor, cause the processor to perform operations including:
      receiving, at a first time, a search term at a computing device coupled to a first content source storing first video content, the search term related to metadata of the first video content, wherein the first video content is associated with a first user;
      receiving information based on the search term, the information identifying second video content available from a second content source, the second video content available for streaming at a second time following the first time, wherein the second video content is associated with a second user; and
      determining a streaming schedule of a streaming video channel to present content related to the search term, wherein the streaming schedule spans a time period including the second time, and wherein determining the streaming schedule includes:
adding an identifier of the first video content to the streaming schedule;
identifying a scheduling gap in the streaming schedule, the scheduling gap corresponding to the second time; and
in response to identifying the scheduling gap, adding an identifier of the second video content to the streaming schedule to fill the scheduling gap.

10. The apparatus of claim 9, wherein the operations further include:
retrieving the first video content from the first content source; and
retrieving the second video content from the second content source.

11. The apparatus of claim 10, wherein the operations further include generating a video stream corresponding to the streaming video channel based on the first video content and the second video content.

12. The apparatus of claim 11, wherein the operations further include sending a video stream corresponding to the streaming video channel to a destination device.

13. The apparatus of claim 9, wherein the operations further include sending the streaming schedule to a destination device to enable the destination device to request the first video content at the first time and to request the second video content at the second time.

14. The apparatus of claim 9, the operations further including:
querying a data store based on the search term to identify the second video content available from the second content source.

15. The apparatus of claim 9, wherein the second content source comprises a media server that is configured to stream the second video content.

16. A computer-readable storage device storing instructions that, when executed by a processor, cause the processor to perform operations including:
receiving, at a first time, a search term at a computing device coupled to a first content source storing first video content, the search term related to metadata of the first video content, wherein the first video content is associated with a first user;
receiving information based on the search term, the information associated with second video content available from a second content source, the second video content available for streaming at a second time following the first time, wherein the second video content is associated with a second user; and
determining a streaming schedule of a streaming video channel to present content related to the search term, wherein the streaming schedule spans a time period including the second time, and wherein determining the streaming schedule includes:
adding an identifier of the first video content to the streaming schedule;
identifying a scheduling gap in the streaming schedule, the scheduling gap corresponding to the second time; and
in response to identifying the scheduling gap, adding an identifier of the second video content to the streaming schedule to fill the scheduling gap.

17. The computer-readable storage device of claim 16, wherein the operations further include sending data associated with the first video content to a content marketplace.

18. The computer-readable storage device of claim 16, wherein the operations further include:
receiving updated information associated with the second video content; and
updating the streaming schedule of the streaming video channel based on the updated information associated with the second video content.

19. The computer-readable storage device of claim 18, wherein the updated information indicates that the second video content is no longer available, is delayed, has a modified duration, has a modified start time, has a modified stop time, has a modified fee, has a modified license, or any combination thereof.

* * * * *